(12) United States Patent
Seyvet et al.

(10) Patent No.: US 11,652,708 B2
(45) Date of Patent: *May 16, 2023

(54) POLICIES FOR ANALYTICS FRAMEWORKS IN TELECOMMUNICATION CLOUDS

(71) Applicant: Telefonaktiebolaget LM Ericsson (publ), Stockholm (SE)

(72) Inventors: Nicolas Seyvet, Stockholm (SE); Jawwad Ahmed, Kista (SE); Rickard Cöster, Hägersten (SE); Andreas Johnsson, Uppsala (SE); Tony Larsson, Stockholm (SE); Ignacio Manuel Mulas Viela, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,846

(22) Filed: Apr. 5, 2022

(65) Prior Publication Data
US 2022/0231924 A1 Jul. 21, 2022

Related U.S. Application Data

(63) Continuation of application No. 15/516,726, filed as application No. PCT/SE2014/051212 on Oct. 14, 2014, now Pat. No. 11,329,892.

(51) Int. Cl.
*H04L 41/5009* (2022.01)
*H04L 41/5003* (2022.01)
(Continued)

(52) U.S. Cl.
CPC ...... *H04L 41/5009* (2013.01); *H04L 41/5003* (2013.01); *H04L 41/5019* (2013.01); *H04L 67/10* (2013.01)

(58) Field of Classification Search
None
See application file for complete search history.

(56) References Cited

U.S. PATENT DOCUMENTS

| | | | | | |
|---|---|---|---|---|---|
| 7,305,431 | B2 * | 12/2007 | Karnik | ............... | G06F 9/5055 705/52 |
| 9,311,611 | B2 * | 4/2016 | Suer | .................. | G06Q 10/06 |

(Continued)

OTHER PUBLICATIONS

Rajarajeswari, C., et al., "Resource Provisioning for SLA Management", 2013 International Conference on Advanced Computing and Communication Systems, Dec. 19-21, 2013, pp. 1-6, Coimbatore, India.

(Continued)

*Primary Examiner* — Mohamed Ibrahim
(74) *Attorney, Agent, or Firm* — Coats & Bennett, PLLC

(57) ABSTRACT

In a communication system, a first network node is configured to execute at least one service application executing a first service and at least one analytics application executing at least part of a distributed analytics service. The first network node obtains information about a new telecommunication service and transmits, to a second network node in the communication system, a request for a policy for the new telecommunication service. The first network node receives, from the second network node, the policy for the new telecommunication service and updates a currently applied policy on the basis of the received policy. The updated policy rebalances resources allocated from a shared computing resource pool of the first network node between the new telecommunication service and the at least one analytics application such that the new telecommunication service maintains adherence to the one or more requirements of a service level agreement.

20 Claims, 7 Drawing Sheets

(51) Int. Cl.
*H04L 41/5019* (2022.01)
*H04L 67/10* (2022.01)

(56) References Cited

U.S. PATENT DOCUMENTS

| | | | |
|---|---|---|---|
| 9,864,636 B1 | 1/2018 | Patel et al. | |
| 2008/0162592 A1 | 7/2008 | Huang et al. | |
| 2010/0083145 A1 | 4/2010 | Schang et al. | |
| 2010/0088234 A1* | 4/2010 | Moore | G06Q 30/0251 |
| | | | 705/52 |
| 2012/0142319 A1 | 6/2012 | Joshi et al. | |
| 2012/0185848 A1 | 7/2012 | Devarakonda et al. | |
| 2012/0296755 A1 | 11/2012 | Toro Escudero et al. | |
| 2013/0036449 A1 | 2/2013 | Mukkara et al. | |
| 2013/0091282 A1 | 4/2013 | Tontiruttananon et al. | |
| 2013/0132561 A1 | 5/2013 | Pasala et al. | |
| 2014/0101228 A1 | 4/2014 | Dalela | |

OTHER PUBLICATIONS

MathWorks, "Model-Based Design with MATLAB and Simulink", MATLAB and Simulink for Technical Computing—MathWorks Nordic, p. 1, retrieved on Aug. 18, 2014, retrieved from Internet http://www.mathworks.se/.

European Telecommunications Standards Institute, "Network Functions Virtualisation (NFV); Use Cases", ETSI GS NFV 001 V1.1.1, Oct. 2013, pp. 1-50.

Stoica, I., "Berkeley Data Analytics Stack (BDAS) Overview", Strata Conference Making Data Work, Feb. 26-28, 2013, pp. 1-28, Santa Clara, CA, retrieved on Jun. 11, 2014, retrieved from Internet http://ampcamp.berkeley.edu/wp-content/uploads/2013/02/Berkeley-Data-Analytics-Stack-BDAS-Overview-Ion-Stoica-Strata-2013.pdf.

Marz, N. et al., "Storm: Distributed and fault-tolerant realtime computation", pp. 1-2, retrieved on Aug. 18, 2014, retrieved from Internet https://storm.incubator.apache.org/.

Openstack, "Welcome to the Ceilometer developer documentation!", pp. 1-2, retrieved on Aug. 18, 2014, retrieved from Internet http://docs.openstack.org/developer/ceilometer/.

Amazon Web Services, "Amazon CloudWatch Developer Guide API Version", Aug. 1, 2010, pp. 1-224, retrieved on May 26, 2014, retrieved from Internet http://awsdocs.s3.amazonaws.com/AmazonCloud Watch/latest/acw-dg.pdf.

Apache Software Foundation, "Apache Hadoop NextGen MapReduce (YARN)", pp. 1-2, retrieved on Aug. 18, 2014, retrieved from Internet http://hadoop.apache.org/docs/r2.3.0/hadoop-yarn/hadoop-yarn-site/YARN.html.

Mirantis, "OpenStack: Now", OpenStack Metering Using Ceilometer—Pure Play OpenStack, pp. 1-14, retrieved on Aug. 18, 2014, retrieved from Internet http://www.mirantis.com/blog/openstack-metering-using-ceilometer/.

R Project, "The R Project for Statistical Computing", p. 1, retrieved on Aug. 18, 2014, retrieved from Internet http://www.r-project.org/.

Dean, J. et al., "MapReduce: Simplified Data Processing on Large Clusters", Communications of the ACM, 2008, pp. 1-13, vol. 51, No. 1.

Zaharia, M. et al., "Spark: Cluster Computing with Working Sets", Proceedings of the 2nd USENIX Conference on Hot Topics in Cloud Computing, 2010, pp. 1-7, USENIX Association.

Sparks, E. et al., "MLI: An API for Distributed Machine Learning", arXiv:1310.5426v2, Oct. 25, 2013, pp. 1-11, AMPLab.

Vmware, Inc., "vCenter Hyperic Resource Configuration and Metrics", 2014, pp. 1-762, retrieved on May 26, 2014, retrieved from Internet http://pubs.vmware.com/hyperic-58/topic/com.vmware.ICbase/PDF/vcenter-hyperic-58-resource-config-guide.pdf.

Osman A. et al., "Towards Real-Time Analytics in the Cloud", 2013 IEEE Ninth World Congress on Services, pp. 428-435, IEEE Computer Society.

* cited by examiner

POLICIES FOR ANALYTICS FRAMEWORKS IN TELECOMMUNICATION CLOUDS

RELATED APPLICATIONS

This application is a continuation of prior U.S. application Ser. No. 15/516,726, filed 4 Apr. 2017, which was the National Stage of International Application PCT/SE2014/051212 filed 14 Oct. 2014, the entire disclosure of each being hereby incorporated by reference herein.

TECHNICAL FIELD

This disclosure relates to policies in telecommunications clouds. In more particular, it relates to a network node and a method therein for execution of an analytics task based on a policy.

BACKGROUND

In cloud computing, a paradigm, the so called cloud computing paradigm, has become a cornerstone for networks and services in which computing, networking and storage of resources are hosted in interconnected and federated datacenters. Infrastructure is made available on demand to users and their applications. Cloud computing and cloud networking may be considered as the logical evolution of the so called grid computing concept with a critical differentiating factor; usage patterns and hardware investments does not need to be planned in beforehand. A cloud user can simply request resources through a cloud resource provider for a specific timeframe and may then be entitled to use resources on the basis of the request for that timeframe.

Cloud infrastructure providers offer core infrastructure while cloud service providers mostly lease these resources to deliver services to end users. Main advantages for users of the cloud comprise lower operating expenditures (OPEX) and capital expenditures (CAPEX), scalability, elasticity and ease of use.

A model of a cloud can be divided into four layers: A hardware layer (1), an infrastructure layer (2), a platform layer (3) and an application layer (4). Each higher layer builds on top of the features and services provided by the lower layers. These layers pertain well to describe the different business models built on the cloud paradigm.

It can be mentioned that the hardware layer typically refers to datacenter and core infrastructure associated with datacenters.

The infrastructure is offered as infrastructure-as-a-service (IaaS) at layer 2 of the cloud.

At layer 3, the platform layer, vendors are providing high-level platforms and environments to develop software or services are often referred to as platform-as-a-service (PaaS). These platforms are usually in the form of operating systems and/or software frameworks. The point is to shield the user from dealing with the underlying complexities of infrastructure entities such as virtual machines (VMs), or containers, virtual networks and raw storage blocks. At the application layer (layer 4) there are different service providers providing business applications, web services, multimedia and gaming services. These qualify as software-as-a-service (SaaS) in the cloud paradigm terminology.

The cloud can also be categorized into the public, hybrid or private cloud. The public cloud aims at delivering IaaS, PaaS or SaaS to the general public. In this case there are no upfront capital costs. However, it fails to provide the granular control over security and different performance and infrastructure level parameters. One specific version of public clouds is the so called virtual private cloud, in which an organization's cloud infrastructure is run on top of the public cloud. In this case virtual private network (VPN) technology is used to virtualize a network infrastructure that essentially provides the organization the flexibility to provide its own network security and topology settings.

Private clouds are built specifically for an organization to provide control over security and different performance related aspects. However an obvious drawback is high upfront costs.

Hybrid clouds try to address some of the limitations of the above mentioned cloud types. Specifically, much of critical business control and services run in the private cloud, while still offering the flexibility to delegate the less critical business services on the public clouds. Hybrid clouds also provide the opportunity to expand the service capacity in peek durations using the public cloud offerings. However, a hybrid cloud may require careful analysis of the splitting the business services that should be run on public cloud based on security, privacy, flexibility, availability and performance requirements.

Yet another type of cloud is the telecommunication cloud, or so called Telco cloud, in which a number of companies in the telecommunication industry offer value to customers and operators not currently addressed.

FIG. 1A illustrates a distributed telecommunication cloud. Resources such as computation, storage and network can be available throughout the network including mobile base stations, the evolved packet core network and in datacenters of various sizes.

Traditional telecommunication services such as the mobile base station, the mobile core network and Internet protocol multimedia subsystem (IMS) can run as virtualized services on top of the telecommunication cloud. This concept of virtualized services on top of the cloud, is often referred to as network function virtualization (NFV) and the concept is being defined in standard groups such as European telecommunications standard institute (ETSI) group specification (GS) NFV. This group has defined and described use cases for various telecommunication functions, how to virtualize the network functions and how they can coexist with a non-virtualized world.

It can also be envisaged other types of services such as industry and factory applications with high performance demands and end-user applications such as collaborative and self-driving cars will execute on the telecommunication cloud. Thus, the telecommunication cloud may have to support mission critical activities such as remote control of factories and robots as well as doctor exams and possibly remote surgery. Some application types may connect directly to the datacenters via the Internet, whereas other may connect through radio access networks.

This puts enormous demands on the telecommunication cloud in terms of reliability, performance and security. The main differences between standard cloud and telecommunications cloud may be summarized in higher demands on service level agreements (SLAs) related to reliability and performance, a more diverse execution environment and regulatory requirements.

Due to high requirements in the telecommunications cloud environment it is important to develop techniques for service assurance to fulfill the SLA requirements, but also to fulfill other requirements. This may involve continuous monitoring of relevant key performance indicators relating to one or more specific SLAs for the service, analyzing resource-related data for finding abnormal trends and anomalies, and triggering suitable cloud actions in case of SLA violations.

Statistical software using a traditional approach to analytics and machine learning is well known. Even though some of these can run in multicore and distributed settings they still suffer from a traditional process centric approach and are not well suited for large-scale distributed data-centric workloads. Big data analytics is a concept to overcome limitations of traditional software.

Google MapReduce has been proposed to overcome many of the challenges of large-scale distributed and data-centric workload problems. One open source version of MapReduce is Hadoop and its interconnected Hadoop distributed file system (HDFS).

HDFS provides a system for storing large files across multiple machines distributed for example within a cloud. This means that HDFS can store files that are much larger than every single hard drive of any machine in the cloud. HDFS is designed to be fault tolerant; due to data replication and data distribution.

MapReduce is a framework for processing parallelizable problems across multiple nodes. Data to be analyzed are accessible from the HDFS. MapReduce comprises two main steps, Map and Reduce.

The Map step can divide a problem into smaller amounts of data to be analyzed and distributes the tasks over a set of Map workers. The result from the Map step can logically be understood as a key-value list. The Map tasks can run in parallel if they are independent of each other.

The Reduce step can summarize the output from the Map step in order to form a result. Also, the Reduce tasks can run in parallel if they are independent of each other.

Analytics jobs may compete for resources at the infrastructure level, and can prevent other located applications executing on the same hardware from performing smoothly in particular if the resources are oversubscribed.

Information about utilization of resources may be gained by monitoring of the cloud infrastructure, to understand the current status of the infrastructure as such, as well as applications running on top. The metrics of interest may be divided into four different categories: compute, memory, network and storage.

Each category can relate to metrics either obtained at the operating system, hypervisor, VM or application level. In the following metrics in each individual category are exemplified. Note that each metric may either be measured for an entire system, for a hypervisor or for each individual virtual machine or application executing in the system.

The computer metrics may be related to the central processing unit (CPU) or the graphics processing unit (GPU) of the system. Memory-related metrics may relate to free memory, swap memory or memory utilization of an application running in a node. Network related metrics are exemplified by number of packets/bytes transmitted or received. Storage metrics comprise disk space, disk reads, disk writes, disk idle time and storage I/O operations.

It should be pointed that monitoring of resources, both virtualized and physical, in cloud computing environments is a relatively mature research area, with production-grade environments operating in large public and private clouds for several years.

Telecommunication clouds introduce a number of challenges to current cloud techniques as indicated above.

Introduction of cloud edges, such as the mobile base station, where resources are limited is a new concept in distributed cloud environments, compared to the traditional approach of dividing a huge amount of resources, enabling everyone to use the same structure, i.e. in a centralized cloud environment.

Moreover, telecommunications applications put stronger requirements on the infrastructure, which means that traditional approaches of managing resources become limited and expose a need for improvements.

Services applications running in the telecommunications cloud will be dependent on analytics, for resource management, trend analysis as well as for anomaly detection and service assurance.

A telecommunications cloud node at the edge of the network typically has restricted amount of resources for running both a service application itself and being part of an analytics framework.

There is hence a need for a solution addressing the issues as discussed above.

SUMMARY

It is an object of exemplary embodiments to address at least some of the issues outlined above, and this object and others are achieved by a network node and a method therein, according to the appended independent claims, and by the exemplary embodiments according to the dependent claims.

According to an aspect, some embodiments provide a method for execution of an analytics task in a first network node of a telecommunication network. The first network node is supported by a distributed cloud infrastructure and executes at least one service application executing a first service, and at least one analytics application executing at least part of a distributed analytics service. The method comprises obtaining, by a node policy agent, a policy for entitling resources to said analytics application, wherein the policy is based on the analytics task and on a service-level agreement (SLA) for the first service. The method also comprises transmitting, by the node policy agent, said policy to a node manager. The method also comprises receiving, by the node manager, an analytics task from a second network node of the telecommunication network. In addition, the method comprises executing, by the node manager, the analytics task within the analytics application, based on the policy.

According to another aspect, some embodiments provide a network node that is adapted to reside in a telecommunication network, and to be supported by a distributed cloud infrastructure, where the network node is capable of executing an analytics task. The network node is adapted to execute at least one service application executing a first service, and at least one analytics application executing at least part of a distributed analytics service. The network node is further adapted to comprise a node policy agent and a node manager residing in any of said at least one service application and said at least one analytics application. The node policy agent of the network node is adapted to obtain a policy for entitling resources to said analytics application, wherein the policy is based on the analytics task and on a SLA, for the first service. The node policy agent is also adapted to transmit said policy to the node manager. The node manager of the network node is adapted to receive an analytics task from a second network node of the telecommunication network; and to execute the analytics task within the analytics application, based on the policy.

According to yet another aspect, some embodiments provide a network node that is adapted to reside in a telecommunication network, and to be supported by a distributed cloud infrastructure, where the network node is capable of executing an analytics task. The network node comprises a processor and a memory, said memory containing instructions executable by said processor whereby said network node is operative to execute at least one service application executing a first service, and at least one analytics application executing at least part of a distributed analytics service. The memory contains instructions executable by said processor whereby said network node is further adapted to comprise a node policy agent and a node manager residing in any of said at least one service application and said at least one analytics application. The memory contains instructions executable by said processor whereby said node policy agent is adapted to obtain a policy for entitling resources to said analytics application, wherein the policy is based on the analytics task and on a SLA, for the first service, and to transmit said policy to the node manager. The memory contains instructions executable by said processor whereby said node manager of the network node is adapted to receive an analytics task from a second network node of the telecommunication network and to execute the analytics task within the analytics application, based on the policy.

According to still yet another aspect, some embodiments provide a computer program comprising instructions which, when executed on at least one processor, cause the at least one processor to carry out the method of the above mentioned aspect.

The present disclosure provides a number of advantages.

Some embodiments provide a policy-based technology for creating a balance in terms of resource utilization between service applications and analytics tasks running on the same physical node.

Some embodiments allow for services running in a telecommunications cloud to put policy restrictions on analytics tasks being executed on the same node.

Embodiments of this disclosure also provide means for enforcing policies for analytics tasks running on a node. This may be critical in order to protect service SLA during e.g. peak hours.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

A network node and a method therefore is herein proposed for prioritization between service applications such as telecommunications services, or so called Telco services, and analytic services, executing on telecommunications cloud nodes with limited hardware (HW) and network capacity.

It is herein provided how to apply a policy for the participation in an analytics framework based on service applications currently running on a telecommunication cloud node.

There is a need to protect resources to service applications running in network nodes in a telecommunications cloud.

This disclosure provides a policy handling and interpretation mechanism for nodes in the telecommunication cloud. The policies describe when and what resources of a specific node which can be offered to an analytics framework executing on a telecommunication cloud node. Policy parameter values may be dependent on the current set of service applications running on the telecommunication cloud node. The policy may be enforced by a specific module located in every telecommunication cloud node.

This disclosure addresses the problem of varying the available resources over time in order to present them to a resource management system like MESOS or YARN for further scheduling. These resources allocators may still decide where to run an analytics task based on the available resources that have been assigned to them by a policy management. However, how this is done is out of the scope of this disclosure.

This disclosure provides flexibility and the possibility to re-use the same resources for different applications, namely service applications and analytics applications, without having to fragment a cluster of resources into one "service part" and an "analytics part" but rather to flexibly assign resources to the one or more service applications or to analytics frameworks.

Figure 1A:
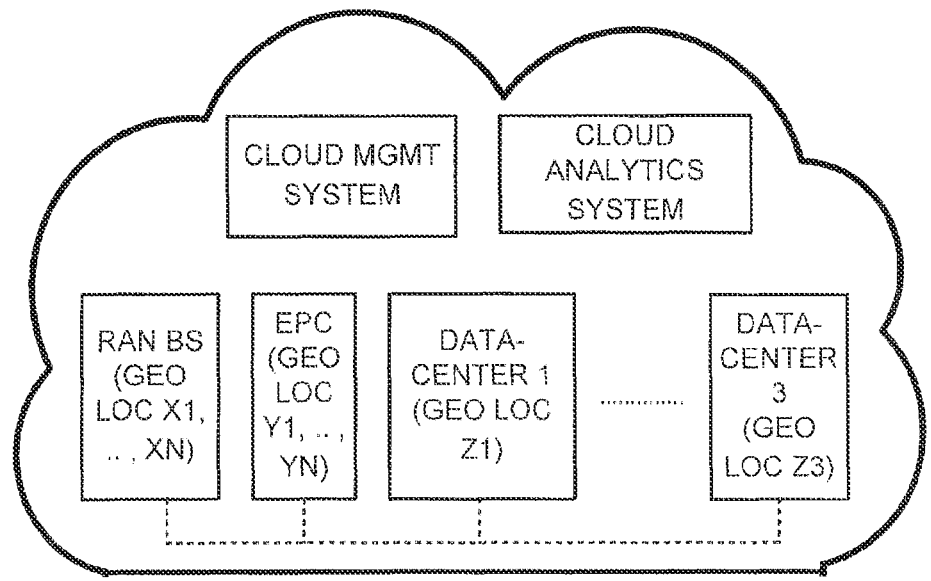
FIG. 1A schematically illustrates a distributed telecommunications cloud, of the prior art.
Figure 1B:
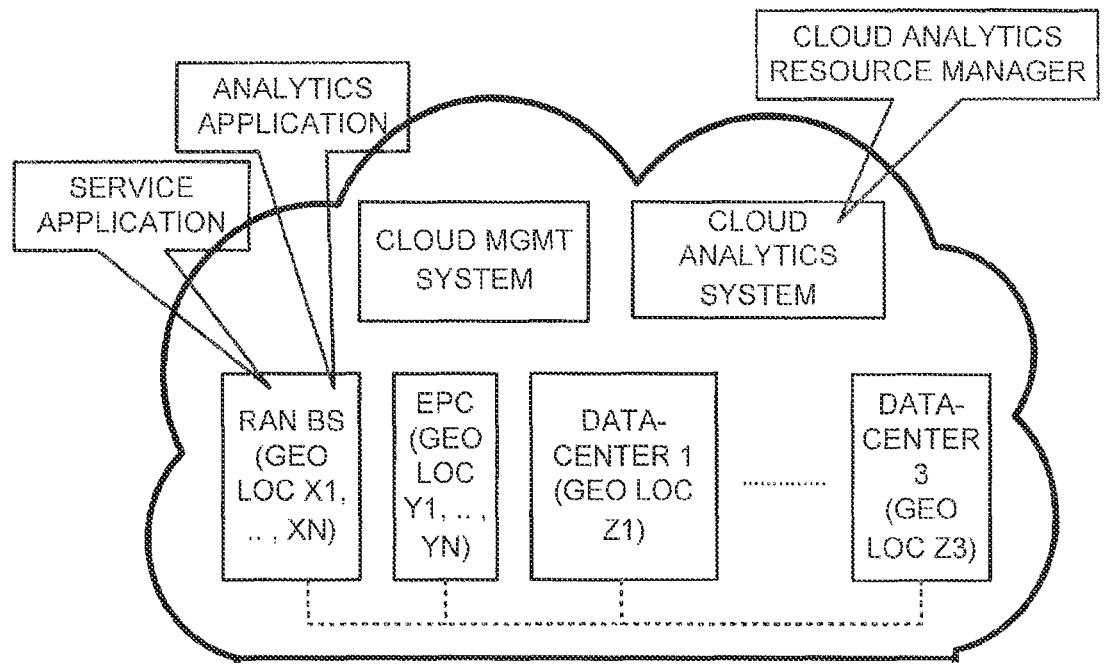
FIG. 1B schematically illustrates one vision of a distributed telecommunications cloud of this disclosure.

FIG. 1B schematically illustrates an overview of the placement of various functions of a distributed telecommunications cloud. The cloud comprises a centralized cloud management system and a centralized cloud analytics system, where the cloud analytics system comprises a cloud analytics resource manager.

This cloud also comprises a distributed radio access network (RAN) base station (BS) positioned at various geographical locations X1, . . . , XN. Each such RAN BS may also execute a service application and an analytics application.

The cloud also comprises a distributed evolved packet core (EPC), positioned at various geographical locations Y1 . . . , YN.

The cloud typically also comprises data centers (DCs), herein illustrated by data center 1 to data center 3, positioned at geographical locations Z1 to Z3.

The data centers may be connected to the RAN BS and the EPC by a software-defined network.

The telecommunications cloud comprises a large data center (DC) at a centralized location Z1 and a set of smaller geographically spread data centers towards the edges of the telecommunication cloud, at locations Z2 (implicitly shown), and Z3.

In the large data center, DC1 it is assumed that enough resources are available, for which reason analytics framework is executed without any shortage of resources. However, further out in the network, the more costly it becomes to allocate dedicated resources for analytics. Therefore service application, such as telecommunication services, and analytics services preferably coexist on the same hardware (HW) node.

When oversubscription occurs this may result in contentions at the HW/resource level. Service applications, especially telecommunications services have strict service level agreements (SLAs) whereas analytics tasks usually are not critical.

It is herein of interest to make sure that the analytics services do not create SLA violations for service applications, for example telecommunications services. Introducing policies for scheduling of the analytics tasks solves this problem.

In order to fulfil the requirements of the telecommunications services in a more distributed environment, wherein edge resources are taken advantage of, and not only from the core of the cloud, there is a demand for more sophisticated methods for managing the resources and controlling the infrastructure. In this sense, analytic services are considered and distinguished as a common part of almost all the telecommunications services and the analytics tasks designed to analyze and optimize the infrastructure itself.

Within the solution herein presented, different natures of both service and analytics applications are benefitted from. The telecommunications applications need to maintain the SLAs and offer a certain quality of service (QoS) whereas the analytics applications have weaker requirements in this sense but in most cases they consume more resources. If these applications are not controlled properly, the analytics activities may well interfere and potentially cause degradation on the telecommunications services.

As both types of applications will be run on the same resources, a mechanism for preventing any degradation on the telecommunications services is hence presented, allowing a smooth functioning of the traditional telecommunications applications while giving the possibility to run analytics tasks onto the same infrastructure.

This disclosure provides components for achieving policy handling and enforcement for analytics tasks in a telecommunication cloud environment.

Figure 2A:
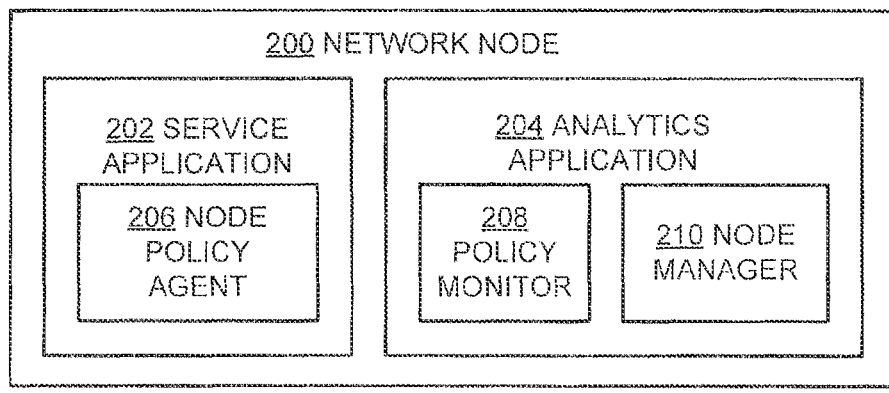
FIGS. 2A and 2B illustrate two overviews of placement of applications and components in a network node, according to exemplary embodiments.

FIG. 2A illustrates an overview of placement of applications and components in a network node 200, according to some embodiments. The network node executes a service application 202 and analytics application 204. FIG. 2A also presents a node policy agent 206 located herein positioned within the service application 202. The analytics application 204 is here presented to comprise a policy monitor 208 and a node manager 210.

Figure 2B:
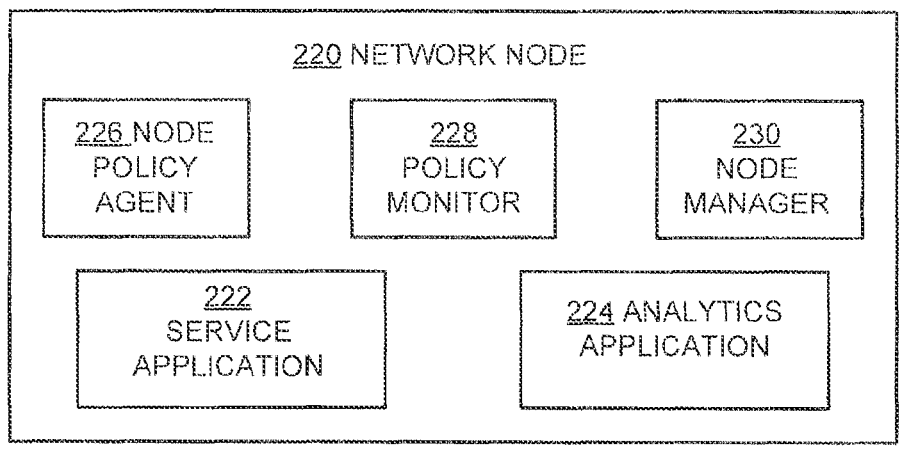

FIG. 2B illustrates an overview of another placement of applications and components in a network node 220, according to some embodiments. This network node executes a service application 222 and an analytics application 224, similar to the network node 200 illustrated in FIG. 2A. However, in the network node 220 of FIG. 2B, the node policy agent 226, the policy monitor 228 and the node manager 230 are executed outside the illustrated service application 222 and analytics application 224.

It should be noted that FIGS. 2A and 2B illustrate two exemplary overviews of placements of applications and components in a network node according to the present disclosure. Other placements of applications and components in a network node may also be envisaged, within the scope of the appended claims.

It is pointed out that that the components may communicate with an analytics framework resource manager, as of FIG. 1B. The analytics framework resource manager is only briefly mentioned herein and is not part of this disclosure.

The node policy agent 206, 226 may be responsible for defining a policy for the analytics tasks to be executed in the network node. The policy parameter values may be based on existing service applications being executed on the network node, and its requirements as well as resources available.

A policy may be iteratively defined in a process and may be defined at least every time a service application is modified, scaled, changed or if a new analytics task, or virtual machine or container is migrated to the network node.

Said node policy agent may either select or alter an existing policy or create a new policy based on a set of policy parameter values.

The node manager 210, 230 may be responsible for executing analytics tasks assigned from a centralized resource manager. The node manager may obtain a policy definition from the node policy agent. Furthermore, it may receive, in real time, resource consumption samples or resource availability samples from a policy monitor that may be responsible for sampling resource consumption per analytics task. Sampling shall preferably be frequent enough so as to capture quick variations as well as trends.

It is mentioned that one possible implementation of this policy monitor is Ceilometer in known OpenStack.

Moreover, the node manager may then perform a comparison between consumed resources (or resources being consumed) and the policy for each sample. If the policy is violated, the node manager may act to remedy the violation in a number of different ways. Some of these are explicitly provided in connection with FIG. 7, below.

Policies express the analytics application intentions vis-a-vis handling priorities between running analytics and telecommunications services. It is intended that the telecommunications services applications will always have priority over the analytics applications. At the edge of the network, there are low resources and high SLAs. As such, policies may hence dictate how analytics applications will behave.

Figure 3:
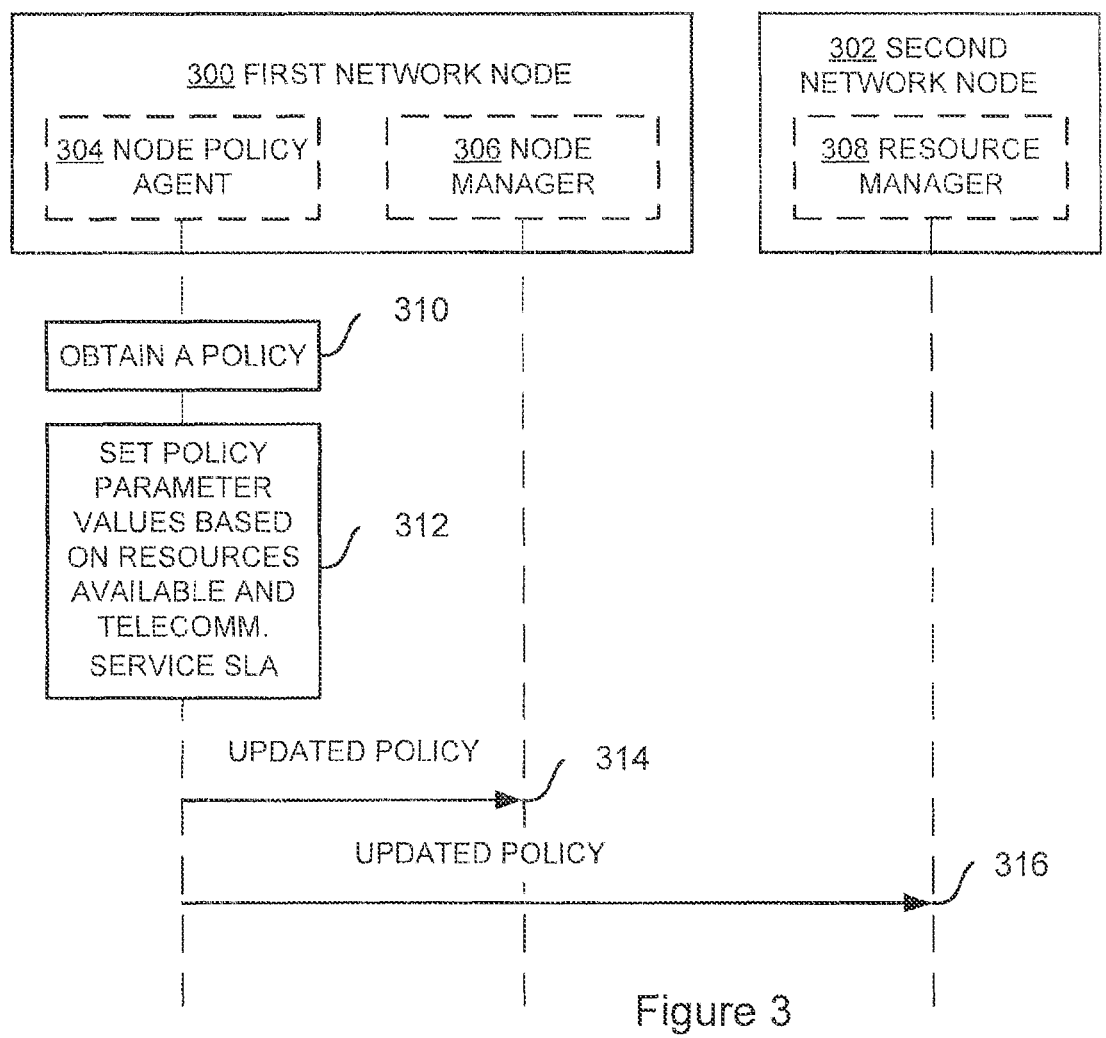
FIG. 3 presents a handshake diagram of signaling for defining an analytics task policy, related to exemplary embodiments.

FIG. 3 presents a handshake diagram of signaling for defining an analytics task policy, related to some embodiments. Signaling is performed between a node policy agent 304, a node manager 306, both executed within a first network node 300, and a resource manager 308 executed within a second network node 302. It should be pointed out that the first network node 300 correspond to the network nodes 200 and 220. The components of FIG. 3 also correspond to the components of FIGS. 2A and 2B.

In 310, the node policy agent 304 obtains a policy.

In 312, the node policy agent 304 sets policy parameter values based on resources available and a SLA of a telecommunication service.

In 314, the node policy agent 304 transmits the thereby created updated policy, to the node manager 306.

In 316, the node policy agent 304 transmits the updated policy to the resource manager 308.

The policy parameter values may be hardcoded for each type of telecommunication service. The policy parameter values may be based on current resource utilization and a maximum amount of resources available in the network node.

Transmitting the updated policy to the analytics resource manager and to the node manager, may correspond to an altered YARN or Mesos system.

A policy as herein used, may be defined, but not exclusively, in terms of parameters related to the following measures:

Time periods for allowing analytics tasks in general;
Resources available and associated thresholds therefore relating to:
  Time periods for all below,
  Number of CPU cycles per time unit or in total,
  Memory constraints,
  Network capacity consumption,
  Hard drive utilization,
  Restrictions on data for analytics,
  Only accept data from local network,
  Do not transmit sensitive data to other parts of the network;
Analytics task close down policy and priority;
Possibly conflicting policy handling; and
Requirements on analytics tasks for the service application running on the node.

Policy entries of policy parameter values may be a set of related action, source, and target attribute/value pairs of a single extensive markup language (XML) element of the form <policyEntry action="value" source="value" target="value"/>.

The action attribute may specify control points that the node is permitted to use and which the policy enforcement mechanism is able to mediate.

The source attribute may specify named objects or applications on the node, such as interface names, Internet protocol (IP) addresses, or file path names that further refine the action attribute.

The target attribute may specify points of interface or reference to complete an action.

The source and target attribute values of a policy entry may depend entirely on the value of the action attribute.

Three example values for the action attribute could be: kill, continue but do not accept additional tasks, and ignore, here being equivalent to no policy.

It should be mentioned that killing an analytics task as part of a service is not detrimental. One of the properties of a big analytics framework—such as Hadoop is that rather than to rely on hardware to deliver high-availability, the frameworks themselves are designed to detect and handle failures at the application layer, to deliver a highly available service on top of a cluster of computers, each of which may be prone to failures. The map-reduce concept, as mentioned above, is constructed around having a pool of machines, the pool being as large as possible, and as such expects that errors will occur. As such, killing a running task, either a map or a reduce task, will be handled seamlessly by the framework, and the overall job will not fail.

A typical scenario where the policies in this disclosure could be useful is, for example, in case the radio base station (RBS) is entering peak activity. At that point it would be required to allocate more CPU cycles or bandwidth to the RBS service, and as a result decrease the number of tasks running in the analytics framework.

Figure 4:
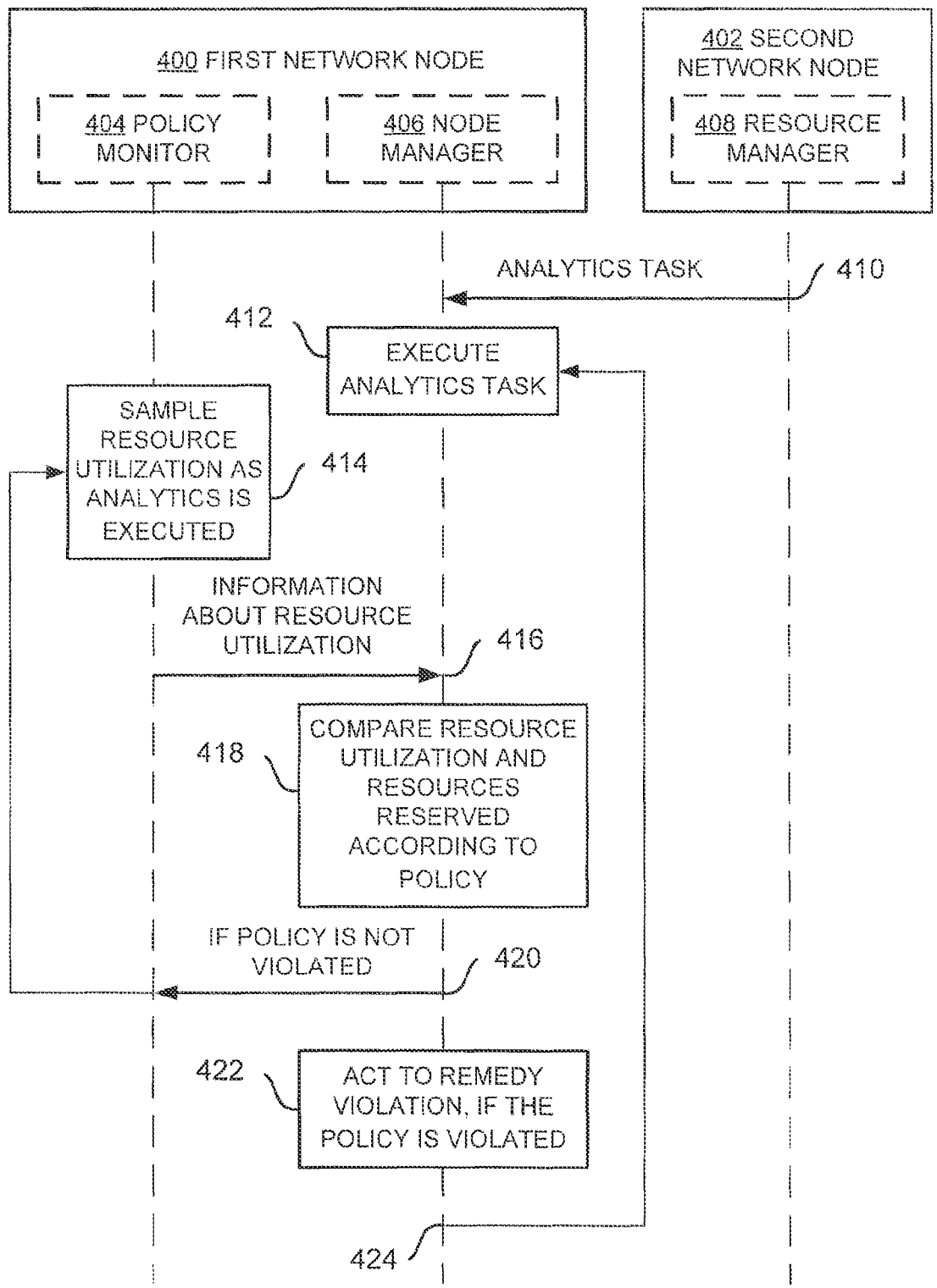
FIG. 4 presents a handshake diagram of signaling for enforcing an analytics task policy, according to exemplary embodiments.

FIG. 4 presents a handshake diagram of signaling for enforcing an analytics task policy, related to some embodiments. Signaling is performed between a policy monitor 404, a node manager 406, both executed within a first network node 400, and a resource manager 408 executed within a second network node 402.

It should be pointed out that the first network node 400 corresponds to the network nodes 200, 220 and 300. The second network node 402 corresponds to the second network node 302. The components of FIG. 4 also correspond to the components of FIGS. 2A and 2B.

In 410, an analytics task is sent from the resource manager 408 to the node manager 406. In 412, the node manager 406 executes the analytics task. In 414, the policy monitor 404 samples resource utilization while the analytics task is executed. In 416, the policy monitor 404 transmits information about resource utilization to the node manager 406.

In 418, the node manager 406 compares the resource utilization and resources entitled to the analytics application.

In 420, if the policy is not violated, the node manager 406 transmits a signal to the policy monitor 404, after which step 414 is executed, as described above.

In 422, if the policy is violated, the node manager 406 acts to remedy the violation.

In 424, the node manager 406 transmits a signal internally to step 412, after which the analytics task is executed.

Figure 5:
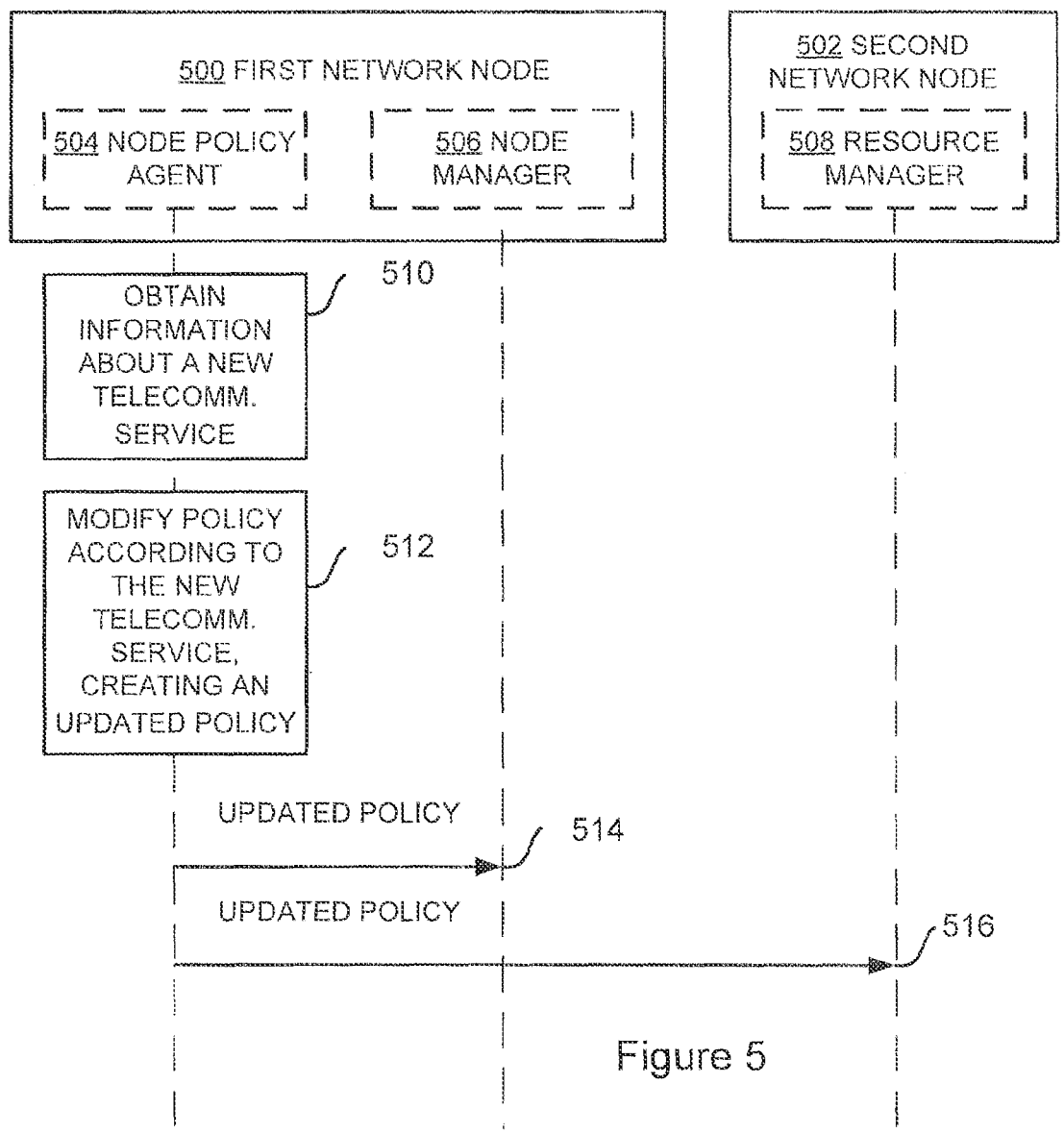
FIGS. 5 and 6 present handshake diagrams of signaling for updating a policy based on a new telecommunications service, according to exemplary embodiments.

FIG. 5 presents a handshake diagram of signaling for updating a policy based on a new telecommunications service, according to some embodiments. Signaling is performed between a node policy agent 504, a node manager 506, both executed within a first network node 500, and a resource manager 508 executed within a second network node 502.

It should be pointed out that the first network node 500 corresponds to the network nodes 200 and 220, as well as to the first network nodes 300 and 400. The second network node 502 corresponds to the second network nodes 302 and 402. The components of FIG. 5 also correspond to the components of FIGS. 2A and 2B.

In 510, the node policy agent 504 obtains information about a new telecommunication service. In 512, the node policy agent 504 modifies the policy according to the new telecommunication service, thereby creating an updated policy.

In 514, the node policy agent 504 transmits the updated policy to the node manager 506.

In 516, the node policy agent 504 transmits the updated policy to the resource manager 508.

Figure 6:
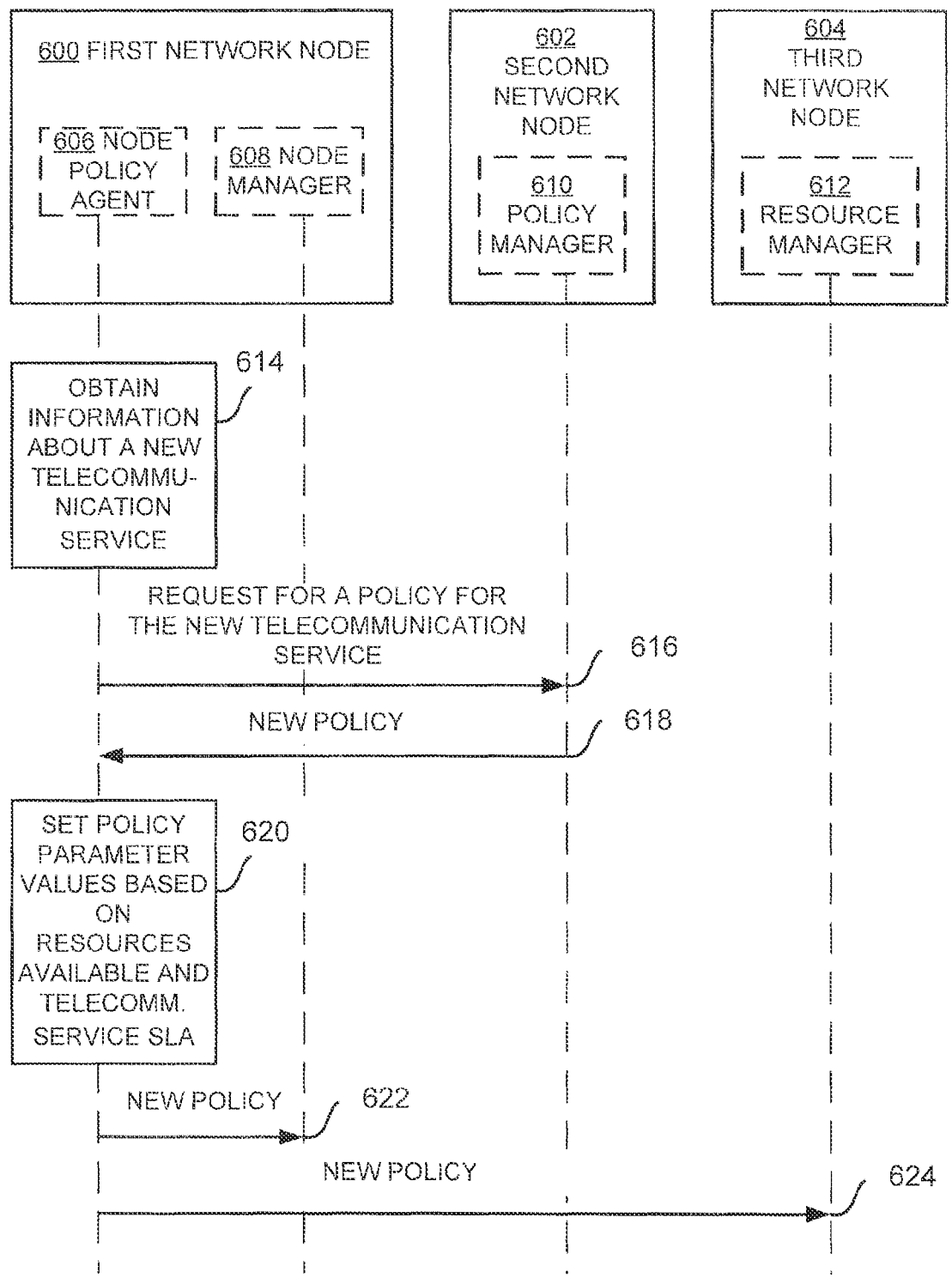

FIG. 6 also presents a handshake diagram of signaling for updating a policy based on a new telecommunications service, according to some embodiments. Signaling is herein performed between a first network node 600, a second network node 602 and a third network node 604. The first network node 600 executes a policy node agent 606 and a node manager 608. The second network node 602 executes a policy manager 610. The third network node 604 executes a resource manager 612.

It should be pointed out that the first network node 600 corresponds to the network nodes 200 and 220, as well as to the first network nodes 300, 400 and 500. The third network node 604, executing the resource manager 612 corresponds to the second network nodes 302, 402, and 502. The components of FIG. 6 also correspond to the components of FIGS. 2A and 2B.

In 614, the node policy agent 606 obtains information about a new telecommunication service.

In 616, the node policy agent 606 transmits a request to the policy manager 610, for a policy for the new telecommunication service.

In 618, the policy manager 610 transmits the policy for the new telecommunication service to the node policy agent 606.

In 620, the node policy agent 606 sets policy parameter values based on resources available and the service level agreement for the telecommunication service, thereby updating the policy.

In 622, the node policy agent 606 transmits the updated new policy to the node manager 608.

In 624, the node policy agent 606 transmits the updated new policy to the resource manager 612.

The policy manager 610 may be responsible for transmitting policy updates to node policy agent 606 of the first network node 600. Transmitting an update may be done by sending a difference between an existing policy and changes to apply to the existing policy.

It is noted that the node manager 608 is responsible for acting locally on the analytics application i.e. it has local control on the analytics service.

At start up of an application task, the node policy agent 606 may use a single uniform resource location (URL) representing a "template" policy for the first network node 600. For example, if this network node contains a YARN container, it is likely that a telecommunication-YARN policy template can be shared via multiple network nodes. The policy manager 610 may be responsible for storing the template policies.

At regular interval, for instance, the node policy agent 606 may update the policy manager with the policies currently applied on the network node. In the case where an application malfunctions by for instance crashes, the policy manager may then be able to detect a disappearing node policy agent. In addition, if some of the updates to a policy are not applied on a network node after a specified interval, the policy manager 610 may be able to detect it and to re-send an update.

Figure 7:
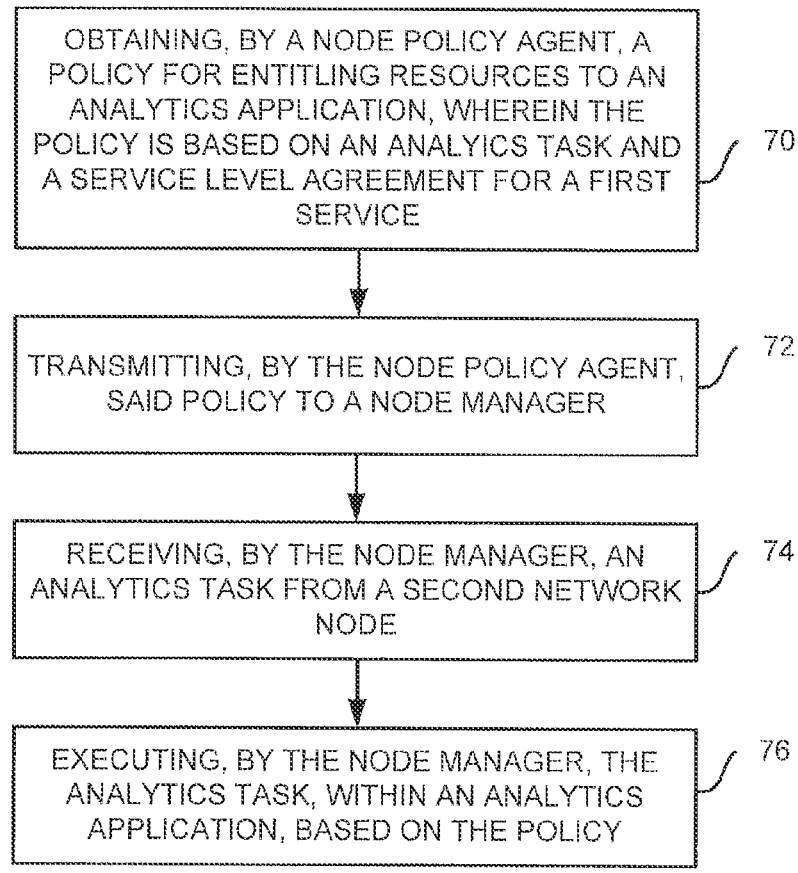
FIG. 7 illustrates a flowchart of a method in a network node, according to exemplary embodiments.

FIG. 7 illustrates a flowchart of a method for execution of an analytics task in a first network node 200, 220, 300, 400, 500, 600 of a telecommunication network, according to some embodiments. The first network node 200, 220, 300, 400, 500, 600 supports a distributed cloud infrastructure and executes at least one service application 202, 222 executing a first service and at least one analytics application 204 executing at least part of a distributed analytics service. In 70, the method comprises obtaining by a node policy agent 206, 226, 304, 504, 606 a policy for entitling resources to said analytics application, wherein the policy is based on the analytics task and on a service-level agreement (SLA) for the first service. In 72, the method comprises transmitting by the node policy agent, said policy to a node manager 210, 230, 306, 406, 506, 608. In 74, the method comprises receiving, by the node manager, an analytics task from a second network node 402 of the telecommunication network. In 76, the method comprises executing by the node manager the analytics task within the analytics application, based on the policy.

The SLA for the first service, on which obtaining 70 the policy for reserving resources, is based, may concern an amount of processing resources, networking resources and storing resources, which the service application has access to according to the SLA.

Obtaining 70 the policy may comprise setting, by the node policy agent, policy parameter values of a policy residing within the node policy agent.

The method may comprise noticing that a second service is being executed by the service application; and wherein obtaining 70 the policy may comprise modifying 512 policy parameter values of the policy based on a SLA for the second service.

Modifying policy 512 parameter values of the policy may comprise one or more of: updating time periods during which analytics tasks are allowed; updating processing and memory resources available to the analytics task; and updating data transmission restrictions for the analytics task.

The method may further comprise noticing that a second service is being executed by the service application; requesting, from a policy manager 610 of the second network node 602, a second policy, and wherein obtaining the policy comprises receiving the second policy from the policy manager.

The method may further comprise sampling 414, by a policy monitor 404, of resource utilization of the analytics task, transmitting 416, by the policy monitor, information about the resource utilization to the node manager; and comparing 418, by the node manager the resource utilization being sampled and resources entitled to the analytics application in the first network node.

Executing the analytics task based on the policy, may comprise acting 422, by the node manager, to remedy a violation of the policy, if it is violated by analytics task being executed by the node manager; and continuing the sampling of the resource utilization, if the policy is not violated by the analytics task being executed by the node manager.

Acting 422, by the node manager to remedy the violation, may comprise one or more of: stopping execution of an analytics task immediately; delaying the execution of an analytics task; letting an analytics task to continue but denying execution of new analytics tasks received from a resource manager; stopping an analytics task, and starting to replicate data to be analyzed in the analytics task to another network node having available resources so that the analytics task will continue on said another network node; and performing any of the above actions based on a priority of analytics tasks being executed on the first network node.

The method may further comprise determining, by the node manager, whether the policy is violated.

The analytics task may be comprised by the distributed analytics service.

The analytics service may be distributed in the distributed cloud infrastructure.

The first service may comprise a telecommunication service.

This disclosure also provides a network node 200, 220, 300, 400, 500, 600 that is adapted to reside in a telecommunication network, and to support a distributed cloud infrastructure. The network node is capable of executing an analytics task. The network node is adapted to execute at least one service application 202, 222 executing a first service, and at least one analytics application 204 executing at least part of a distributed analytics service. The network node is further adapted to comprise a node policy agent 206, 226, 304, 504, 606 and a node manager 210, 230, 306, 406, 506, 608 residing in any of said at least one service application and said at least one analytics application. The node policy agent is adapted to obtain 310, 70 a policy for entitling resources to said analytics application, wherein the policy is based on the analytics task and on a SLA for the first service. The node policy agent is adapted to transmit 314, 514, 622, 72 said policy to the node manager. The node manager of the network node is adapted to receive 410, 74, an analytics task from a second network node 402 of the telecommunication network. In addition, the node manager is also adapted to execute 412, 76 the analytics task within the analytics application, based on the policy.

The SLA for the first service, based on which the node policy agent 206, 226, 304, 504, 606 is adapted to obtain the policy, may concern an amount of processing, storing and networking resources, which the service application has access to according to the SLA.

The node policy agent of the network node 200, 220, 300, 400, 500, 600 may further be adapted to set policy parameter values of a policy residing within the node policy agent.

The network node 200, 220, 300, 400, 500, 600 may further be adapted to notice that a second service is being executed by the service application; and by the node policy agent 206, 226, 304, 504, 606, to modify policy parameter values of the policy based on a SLA for the second service.

The node policy agent 206, 226, 304, 504, 606 may further be adapted to update time periods during which analytics tasks are allowed; update processing and memory resources available to the analytics task; and update data transmission restrictions for the analytics task.

The network node may further be adapted to notice that a second service is being executed by the service application; and by the node policy agent 206, 226, 304, 504, 606, to request a second policy, from a policy manager 610 of the second network node 602, and to receive the second policy from the policy manager.

Any of said at least one service application and said at least one analytics application of the network node 200, 220, 300, 400, 500, 600 may further comprise a policy monitor 208, 228, 404 that is adapted to sample resource utilization of the analytics task; wherein the policy monitor is adapted to transmit information about the resource utilization to the node manager 210, 230, 306, 406, 506, 608; and wherein the node manager is adapted to compare the resource utilization that is being sampled and resources reserved to the analytics application in the network node.

The node manager may be adapted to act to remedy a violation of the policy, if the policy is violated by an analytics task being executed by the node manager; and to continue to sample resource utilization, if the policy is not violated by the analytics task being executed by the node manager 210, 230, 306, 406, 506, 608.

The node manager 210, 230, 306, 406, 506, 608 may further be adapted to act one or more of: to stop execution of an analytics task immediately; to delay the execution of an analytics task; to let an analytics task to continue but to deny execution of new analytics tasks received from a resource manager 408; to stop an analytics task, and to start to replicate data to another network node having available resources so that said analytics task will continue on said another network node; and to perform any of the above actions based on a priority of analytics tasks being executed on the network node.

The node manager 210, 230, 306, 406, 506, 608 of the network node 200, 220, 300, 400, 500, 600 may further be adapted to, determine whether the policy is violated.

The analytics task that the network node 200, 220, 300, 400, 500, 600, 80 is capable of executing, may be comprised by the distributed analytics service.

The analytics service may be distributed in the distributed cloud infrastructure.

The first service of the network node 200, 220, 300, 400, 500, 600, 80 may comprise a telecommunication service.

Figure 8:
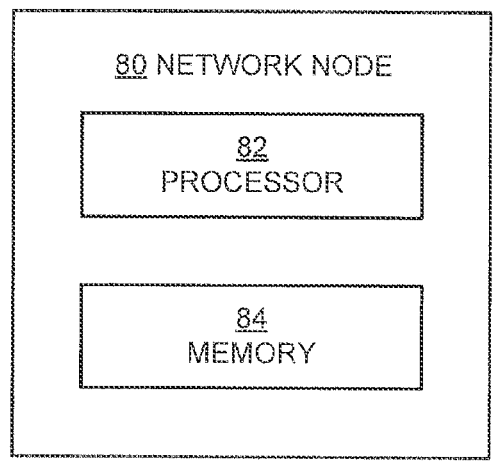
FIG. 8 schematically illustrates a network node, according to exemplary embodiments.

FIG. 8 schematically illustrates a network node 200, 220, 300, 400, 500, 600, 80 according to some embodiments. This network node is adapted to reside in a telecommunication network, and to be supported by a distributed cloud infrastructure, where the network node is capable of executing an analytics task. The network node comprises a processor 82 and a memory 84, said memory containing instructions executable by said processor whereby said network node is operative to execute at least one service application 202, 222 executing a first service, and at least one analytics application 204 executing at least part of a distributed analytics service. The memory contains instructions executable by said processor whereby said network node is further adapted to comprise a node policy agent 206, 226, 304, 504, 606 and a node manager 210, 230, 306, 406, 506, 608 residing in any of said at least one service application and said at least one analytics application. The memory contains instructions executable by said processor whereby said node policy agent is adapted to obtain 310, 70 a policy for entitling resources to said analytics application, wherein the policy is based on the analytics task and on a SLA, for the first service, and to transmit 314, 514, 622, 72 said policy to the node manager. The memory contains instructions executable by said processor whereby said node manager of the network node is adapted to receive 410, 74 an analytics task from a second network node 402 of the telecommunication network and to execute 412, 76 the analytics task within the analytics application, based on the policy.

In addition this disclosure provides a computer program comprising instructions which, when executed on at least one processor 82, cause the at least one processor to carry out the method of the above mentioned aspect.

Embodiments as presented herein comprise the following multiple advantages:

Some embodiments provide a policy-based technology for creating a balance in terms of resource utilization between service applications and analytics tasks running on the same physical node.

Some embodiments allow for services running in a telecommunications cloud to put policy restrictions on analytics tasks being executed on the same node.

Embodiments of this disclosure also provide means for enforcing policies for analytics tasks running on a node. This may be critical in order to protect service SLA during e.g. peak hours.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

BS base station
CAPEX capital expenditures
EPC evolved packet core
ETSI European telecommunications standards institute
GS group specification
HW hardware
IaaS infrastructure as a service
IMS Internet protocol multimedia subsystem
NFV network function virtualization
OPEX operating expenditures
PaaS platform as a service
RAN radio access network
SaaS software as a service
SLA service level agreement
VM virtual machine
VPN virtual private network
XML extensive markup language

The invention claimed is:

1. A method of supporting computer resource management, the method being performed by a first network node that comprises a shared computing resource pool and is supported by a distributed cloud infrastructure, the method comprising:
   executing, within the shared computing resource pool, at least one service application executing a first service and at least one analytics application executing at least part of a distributed analytics service;
   obtaining information about a new telecommunication service;

transmitting a request to a policy manager on a second network node for a policy for the new telecommunication service;

receiving the policy for the new telecommunication service from the policy manager; and updating a currently applied policy on the basis of the received policy, wherein the updated policy rebalances resources allocated from the shared computing resource pool of the first network node between execution of the new telecommunication service and execution of the at least one analytics application such that the new telecommunication service maintains adherence to one or more requirements of a service level agreement.

2. The method of claim 1, further comprising transmitting to the policy manager, the policy currently applied on the first network node.

3. The method of claim 2, wherein the policy currently applied is transmitted to the policy manager at regular intervals.

4. A method of supporting computer resource management, the method being performed by a communication system comprising a first network node and a second network node, the first network node comprising a shared computing resource pool and being supported by a distributed cloud infrastructure, the method comprising:

executing, by the first network node and within the shared computing resource pool, at least one service application executing a first service and at least one analytics application executing at least part of a distributed analytics service;

obtaining, by the first network node, information about a new telecommunication service;

transmitting, by the first network node, a request for a policy for the new telecommunication service;

receiving, by the second network node, the request for the policy for the new telecommunication service;

transmitting, by the second network node, the policy for the new telecommunication service;

receiving, by the first network node, the policy for the new telecommunication service; and updating, by the first network node, a currently applied policy on the basis of the received policy, wherein the updated policy rebalances resources allocated from the shared computing resource pool of the first network node between execution of the new telecommunication service and execution of the at least one analytics application such that the new telecommunication service maintains adherence to one or more requirements of a service level agreement.

5. The method of claim 4, further comprising:

transmitting, by the first network node, the policy currently applied on the first network node; and receiving, by the second network node, the policy currently applied on the first network node.

6. The method of claim 5, wherein the policy currently applied is transmitted to the second network node, by the first network node, at regular intervals.

7. The method of claim 5, further comprising detecting, by the second network node, an application malfunction based on the policy currently applied.

8. The method of claim 5, further comprising retransmitting, by the second network node, the policy if the policy currently applied does not match the transmitted policy.

9. The method of claim 4, further comprising transmitting, by the second network node, a policy update.

10. The method of claim 9, wherein transmitting, by the second network node, the policy update further comprises transmitting a difference between an existing policy and changes to apply to the existing policy.

11. A first network node adapted to reside in a telecommunication network, wherein the first network node comprises:

a shared computing resource pool;

processing circuitry; and memory containing instructions executable by the processing circuitry whereby the first network node is configured to:

obtain information about a new telecommunication service;

transmit a request to a policy manager on a second network node for a policy update for the new telecommunication service;

receive the policy for the new telecommunication service from the policy manager; and update a currently applied policy on the basis of the received policy, wherein the updated policy rebalances resources allocated from the shared computing resource pool of the first network node between execution of the new telecommunication service and execution of at least one analytics application such that the new telecommunication service maintains adherence to one or more requirements of a service level agreement.

12. The first network node of claim 11, wherein the first network node is further operative to transmit to the policy manager, the policy currently applied on the first network node.

13. The first network node of claim 12, wherein the policy currently applied is transmitted at regular intervals.

14. A communication system comprising:

a first network node and a second network node, wherein the first network node comprises a shared computing resource pool and is supported by a distributed cloud infrastructure, the first network node being configured to:

execute, within the shared computing resource pool, at least one service application executing a first service and at least one analytics application executing at least part of a distributed analytics service;

obtain information about a new telecommunication service;

transmit, to the second network node, a request for a policy for the new telecommunication service;

receive, from the second network node, the policy for the new telecommunication service; and update a currently applied policy on the basis of the received policy, wherein the updated policy rebalances resources allocated from the shared computing resource pool of the first network node between execution of the new telecommunication service and execution of the at least one analytics application such that the new telecommunication service maintains adherence to one or more requirements of a service level agreement; and wherein the second network node is configured to:

receive, from the first network node, the request for the policy for the new telecommunication service; and transmit, to the first network node, the policy for the new telecommunication service.

15. The communication system of claim 14, wherein:
the first network node is further configured to transmit, to the second network node, the policy currently applied on the first network node;
the second network node is further operative to receive, from the first network node, the policy currently applied on the first network node.

16. The communication system of claim 15, wherein the policy currently applied is transmitted, by the first network node, at regular intervals.

17. The communication system of claim 14, wherein the second network node is further configured to detect an application malfunction based on the policy currently applied.

18. The communication system of claim 15, wherein the second network node is further operative to re-transmit, to the first network node, the policy if the policy currently applied does not match the transmitted policy.

19. The communication system of claim 14, wherein the second network node is further operative to transmit, to the first network node, a policy update.

20. The communication system of claim 19, wherein the second network node is further operative to transmit, to the first network node, a policy update by transmitting a difference between an existing policy and changes to apply to the existing policy.

\* \* \* \* \*